US011176077B1

(12) United States Patent
Acharya (10) Patent No.: US 11,176,077 B1
(45) Date of Patent: Nov. 16, 2021

(54) CONSOLE PORT FOR SERVERS AND STORAGE ARRAYS

(71) Applicant: VCE Company, LLC, Richardson, TX (US)

(72) Inventor: Srinivasa Acharya, Cary, NC (US)

(73) Assignee: EMC IP Holding Company LLC, Round Rock, TX (US)

( * ) Notice: Subject to any disclaimer, the term of this patent is extended or adjusted under 35 U.S.C. 154(b) by 908 days.

(21) Appl. No.: 15/233,358

(22) Filed: Aug. 10, 2016

(51) Int. Cl.
| *G06F 13/40* | (2006.01) |
| *H04L 29/08* | (2006.01) |
| *G06F 13/36* | (2006.01) |
| *G06F 13/42* | (2006.01) |
| *G06F 9/4401* | (2018.01) |
| *G06F 1/26* | (2006.01) |

(52) U.S. Cl.
CPC .......... *G06F 13/4068* (2013.01); *G06F 1/266* (2013.01); *G06F 9/4416* (2013.01); *G06F 13/36* (2013.01); *G06F 13/4282* (2013.01); *H04L 67/1097* (2013.01); *G06F 2213/0042* (2013.01)

(58) Field of Classification Search
CPC .................................................... G06F 13/385
See application file for complete search history.

(56) References Cited

U.S. PATENT DOCUMENTS

| 7,290,072 B2 * | 10/2007 | Quraishi | G07F 17/32 |
| | | | 463/22 |
| 2013/0278205 A1 * | 10/2013 | Mullins | G06F 21/44 |
| | | | 320/107 |
| 2016/0020911 A1 * | 1/2016 | Sipes, Jr. | H04B 10/808 |
| | | | 398/16 |

* cited by examiner

*Primary Examiner* — Henry Tsai
*Assistant Examiner* — Juanito Borromeo
(74) *Attorney, Agent, or Firm* — Womble Bond Dickinson (US) LLP (57) ABSTRACT

A server/storage array console port for providing a service connection interface to a storage array or server is disclosed. The server/storage array console port includes a receptacle that is coupled to the server or storage array and that is configured to receive a reversible connector. The console port further includes a plurality of connection interface components integral with the receptacle. A first number of the plurality of connection interface components are for video transmission and a second number of the plurality of connection interface components are for power transmission. Video and power are transmitted simultaneously.

25 Claims, 8 Drawing Sheets

CONSOLE PORT FOR SERVERS AND STORAGE ARRAYS

FIELD OF THE DISCLOSURE

Aspects of the disclosure relate to console port technology and, more particularly, to a console port for servers and storage arrays.

BACKGROUND

To perform diagnostics and/or other management functions on a data center electronic system (e.g., servers, storage arrays), technicians or other staff have to gain access to the data center electronic system. Many data center electronic systems have a console port (e.g., a management port) that is used for this purpose. Console ports are used to connect a computer input/output device such as a KVM (Keyboard-Video Monitor-Mouse) directly to a data center electronic system for purposes of managing the data center electronic system because it may not have a display. A special type of cable/dongle is used to connect a computer input/output device to a data center electronic system console port. For example, one end of the cable can have a first type connector and the other end of the cable a second type connector.

Conventional console ports on conventional data center electronic systems such as enterprise blade and rack servers, and data storage systems, rely on conventional cables and connectors, and are not easy to connect. Moreover, conventional console ports are not configured to power monitors or other peripheral devices that may be useful in a datacenter. In addition, conventional console ports do not support network booting or multiple protocols and have a limited data transfer speed. Furthermore, each datacenter electronic system can use proprietary console ports. Thus, the corresponding plethora of differing type cables/dongles used to facilitate troubleshooting of data center electronic systems that utilize such proprietary console ports can be cumbersome.

SUMMARY

Conventional proprietary console ports can be difficult to connect and lack functionality that can be useful in a data center environment. A server/storage array console port for providing a service connection interface to a server or storage array is disclosed that addresses the aforementioned shortcomings of conventional technologies. However, the claimed embodiments are not limited to implementations that address any or all of the aforementioned shortcomings. The server/storage array console port includes a receptacle that is coupled to the server or storage array and that is configured to receive a reversible connector. The console port further includes a plurality of connection interface components integral with the receptacle. A first number of the plurality of connection interface components are for video transmission and a second number of the plurality of connection interface components are for power transmission. Video and power are transmitted simultaneously.

It will be appreciated that the above summary is provided merely for purposes of summarizing some example embodiments so as to provide a basic understanding of some aspects of the disclosure. As such, it will be appreciated that the above described example embodiments are merely examples of some embodiments and should not be construed to narrow the scope or spirit of the disclosure in any way. It will be appreciated that the scope of the disclosure encompasses many potential embodiments, some of which will be further described below, in addition to those here summarized. Further, other aspects and advantages of embodiments disclosed herein will become apparent from the following detailed description taken in conjunction with the accompanying drawings which illustrate, by way of example, the principles of the described embodiments.

BRIEF DESCRIPTION OF THE DRAWINGS

Having thus described the disclosure in general terms, reference will now be made to the accompanying drawings, which are not necessarily drawn to scale, and wherein:

DETAILED DESCRIPTION

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "providing" or "receiving" or "transmitting" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Figure 1A:
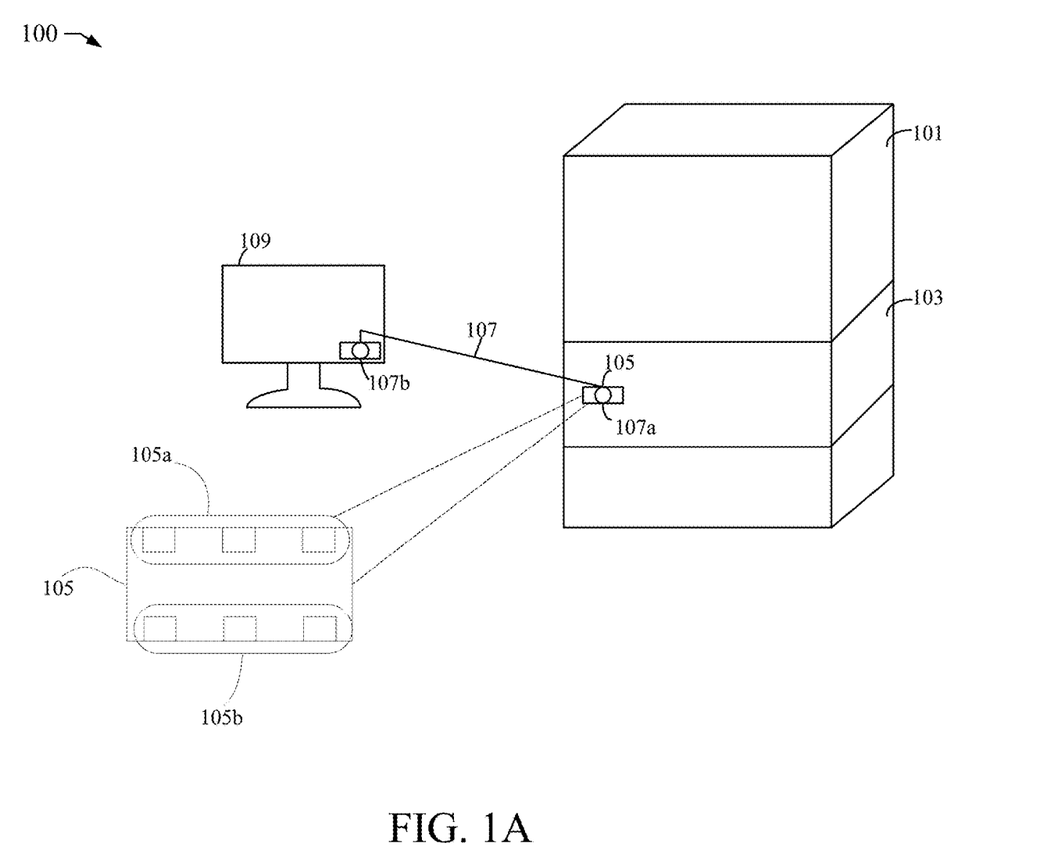
FIG. 1A is a typical operating environment of a reversible connector console/service port for a data center electronic system according to one embodiment.

FIG. 1A is a typical operating environment 100 of a reversible connector console/service port for a data center electronic system (e.g., server, storage array, networking system, converged infrastructure) according to one embodiment. Reversible connector console/service port 105 makes both the connection of a troubleshooting/diagnostic input/output device 109 to a data center electronic system 103, and the troubleshooting of data center electronic system 103, straightforward. The typical operating environment includes module rack 101, data center electronic system 103, console/service port 105, cable 107, connectors 107a and 107b, and troubleshooting/diagnostic input/output device 109. In one embodiment, troubleshooting/diagnostic input/output device 109 can include but is not limited to a KVM (Keyboard-Video Monitor-Mouse) as is described herein (see Table 1).

Data center electronic system 103 is an electronic module comprising an information technology component or components (e.g., server, storage array, networking system, converged infrastructure) that can be mounted in module rack 101. Data center electronic system 103 includes console/service port 105 that serves as an interface between data center electronic system 103 and troubleshooting/diagnostic input/output device 109. In one embodiment, console/service port 105 can additionally serve as an interface to other computers or peripheral devices that can be powered therefrom. In one embodiment, console/service port 105 can have a female construction. In one embodiment, console/service port 105 is integrated with the chassis of data center electronic system 103. In other embodiments, console/service port 105 is not limited to use with data center electronic systems (e.g., 103) but can also be used with other electronic systems such as desktops, laptops and mobile devices.

In one embodiment, console/service port 105 includes a receptacle that is configured to receive a reversible connector 107a or 107b of cable 107. In one embodiment, console/service port 105 can include a plurality of connection interface components integral with the aforementioned receptacle (for example formed inside of the receptacle of console/service port 105). In one embodiment, a first number of the plurality of connection interface components 105a are for video transmission, and a second number of the plurality of connection interface components 105b are for power transmission. In one embodiment, the connection interface components are configured to transmit video and power simultaneously.

In operation, after console/service port 105 is connected to troubleshooting/diagnostic input/output device 109 by cable 107, and troubleshooting/diagnostic input/output device 109 is powered on, a user can log directly into data center electronic system 103, to send diagnostic, troubleshooting, or other type commands. In one embodiment, power is provided to troubleshooting/diagnostic input/output device 109 (that displays a console for troubleshooting/diagnostics) via console/service port 105. In one embodiment, the aforementioned plurality of connection interface components of console/service port 105 are configured to engage components of the reversible connector 107a and 107b for data, video and power transmission. After receiving diagnostic, troubleshooting, or other type commands via console/port 105, from troubleshooting/diagnostic input/output device 109, data center electronic system 103 can transmit video data via console/port 105 to troubleshooting/diagnostic input/output device 109.

In one embodiment, console/service port 105 has many advantages over conventional console ports including the capacity to provide power without the need for an additional power cable up to 32 inches from console/service port 105. In addition, in one embodiment, console/service port 105 supports network booting of data center electronic system 103. Moreover, in one embodiment, console/service port 105 supports a plurality of communication protocols and has the capacity to simultaneously power a plurality of electronic devices. Table 1 below lists some of the advantages of exemplary console/service ports according to one embodiment as compared to conventional console/service ports.

TABLE 1

| Conventional Console Ports | Console Ports of One Embodiment |
|---|---|
| Are not easy to connect | Using Reversible Connector, it is very easy to connect in any direction. |
| Do not power the Monitor | Can power a Monitor up to 32 inches, Do not need Power Cables, |
| VGA Cable | Uses one cable for power and display, which make it easier for Datacenter Troubleshooting |
| Do not support Multiprotocol Only support KVM/USB Devices | Supports Existing Protocols, Network ports, HDMI, Display Port, FireWire Port, Thunderbolt Ports, eSATA, SAS Ports, Serial DB9, Parallel Ports, etc. |
| Do not support Network Boot | Network booting can be supported, using DHCP |
| 400 to 500 Mbps | SuperSpeedPlus USB 10 Gbps (USB 3.1 Gen 2) |
| Cannot Power, Monitor, Laptop or Torch | Can Power a Monitor, Laptop, Torch or Fan, which can be useful in Datacenter |

Figure 1B:
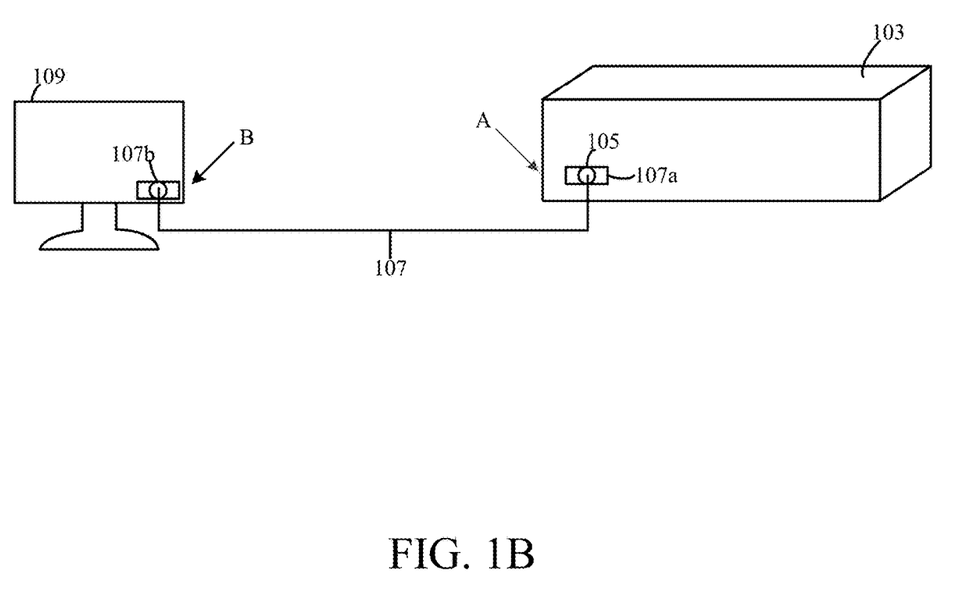
FIG. 1B illustrates the capacity of the console/service port to accommodate reversible connectors according to one embodiment.

FIG. 1B illustrates the capacity of console/service port 105 to accommodate reversible connectors in one embodiment. FIG. 1B shows data center electronic system 103, console/service port 105, cable 107 and troubleshooting/diagnostic input/output device 109. Referring to FIG. 1B, cable 107 includes a first end A 107A and a second end B 107B. As shown in FIG. 1B, in a first configuration first end A can be coupled to console/service port 105 that is associated with data center electronic system 103 and second end B can be coupled to troubleshooting/diagnostic input/output device 109. However, it should be appreciated that in a second configuration, second end B, can be coupled to console/service port 105 that is associated with data center electronic system 103 and first end A can be coupled to troubleshooting/diagnostic input/output device 109. As illustrated, because console/service port 105 has the capacity to accommodate a reversible connector, the connection of data center electronic system 103 to troubleshooting/diagnostic input/output device 109 is straightforward as cable 107 can be connected from either of its ends. This can be contrasted to conventional console/service ports which lack the capacity to accommodate reversible connectors and thus can be more difficult to connect.

Figure 1C:
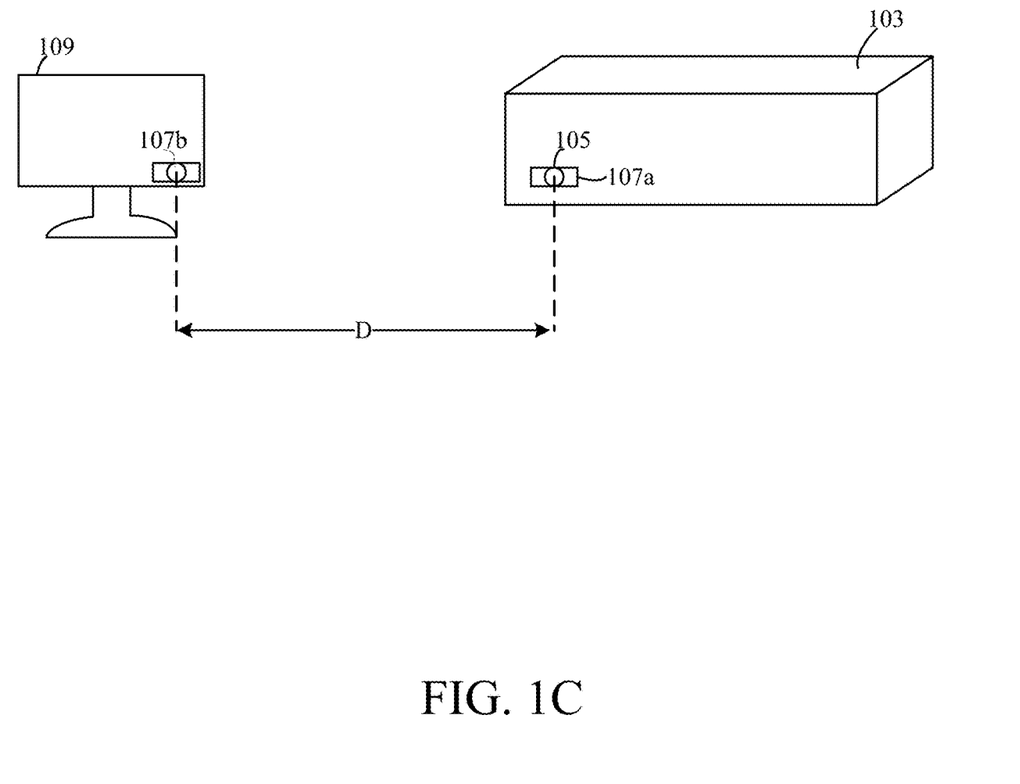
FIG. 1C illustrates the capacity of the console/service port to power a monitor up to a predetermined distance according to one embodiment.

FIG. 1C illustrates the capacity of console/service port 105 to power a monitor up to a predetermined distance D in accordance with one embodiment. Referring to FIG. 1C console/service port 105 is configured to provide sufficient power to power monitor 109 up to a predetermined distance D from console/service port 105 (through cable 107 that delivers voltage via a reversible connector 107a or 107b to troubleshooting/diagnostic input/output device 109). As such, a separate power cable is unnecessary. This can be contrasted to conventional console/service ports that are not configured to provide video and power. Thus, monitors that rely on conventional console/service ports require separate cables for video and power. In one embodiment, because only a single cable is used to provide data and power to a display, both the set up for troubleshooting and diagnostics, and troubleshooting and diagnostics themselves, are made less complicated. Cabling employed by conventional systems can include Video Graphics Array (VGA) cable. It should be appreciated that VGA cable is not reversible as is the reversible cable of embodiments described herein.

Figure 1D:
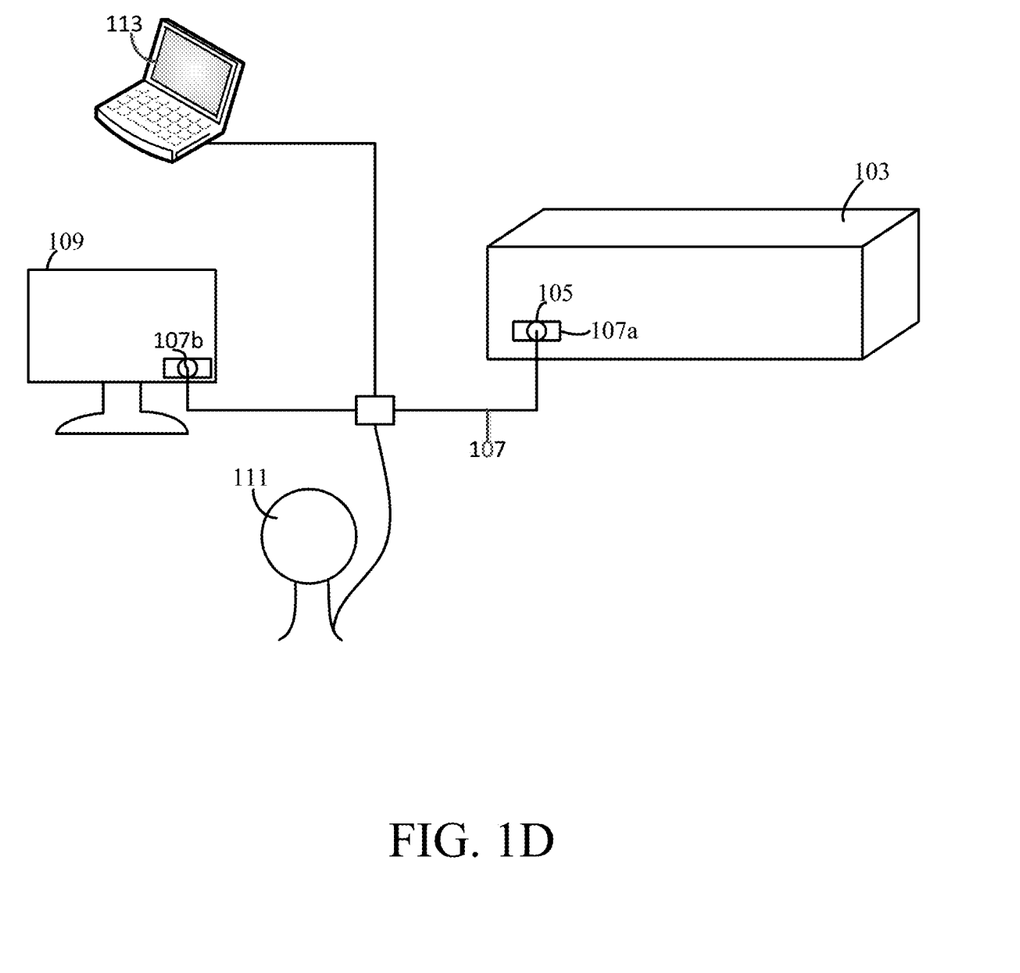
FIG. 1D illustrates the capacity of the console/service port to power peripherals in addition to a monitor according to one embodiment.

FIG. 1D illustrates the power delivery capacity of console/service port 105. In particular, in one embodiment, console/service port 105 is able to power peripherals in addition to troubleshooting/diagnostic input/output device 109. For example, as shown in FIG. 1D, console/service port 105 is configured to provide sufficient power to power laptop 113 and fan 111 in addition to troubleshooting/diagnostic input/output device 109. Under certain conditions such peripherals can be useful in a datacenter. In contrast, conventional console/service ports cannot simultaneously power monitors, laptops and fans/torches.

Figure 1E:
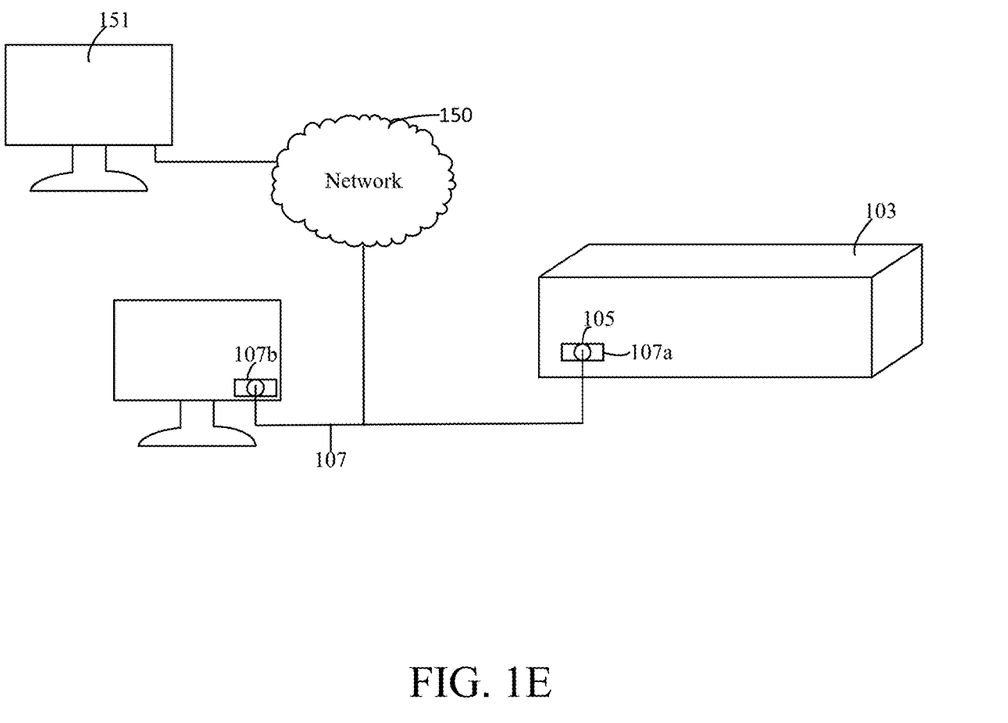
FIG. 1E illustrates the capacity of the console/service port to accommodate network booting according to one embodiment.

FIG. 1E illustrates the capacity of console/service port 105 to accommodate network booting in accordance with one embodiment. Referring to FIG. 1E network booting is the process of booting a computer system, such as electronic system 103, from a network, such as network 150, using a remote system 151 rather than a local drive. In one embodiment, network booting can be supported using Dynamic Host Configuration Protocol (DHCP). DHCP is a standardized network protocol used on Internet Protocol (IP) networks for dynamically distributing network configuration parameters, such as IP addresses for interfaces and services. In one embodiment, with DHCP, a computer can request IP addresses and networking parameters automatically from a DHCP server, reducing the need for a network administrator or a user to configure these settings manually. In contrast, conventional console/service ports do not support such network booting. In addition to DHCP, console/service port 105 supports protocols including but not limited to network ports, HDMI (High-Definition Multimedia Interface), display port, fireWire port, thunderbolt ports, eSATA (Serial AT Attachment), SAS Ports, Serial D89, parallel ports, etc. Console/service port 105 can transmit data at speeds up to 10 Gbps. In contrast, at least some conventional console ports transmit data at much slower speeds between 400 and 500 Mbps.

Figure 2A:
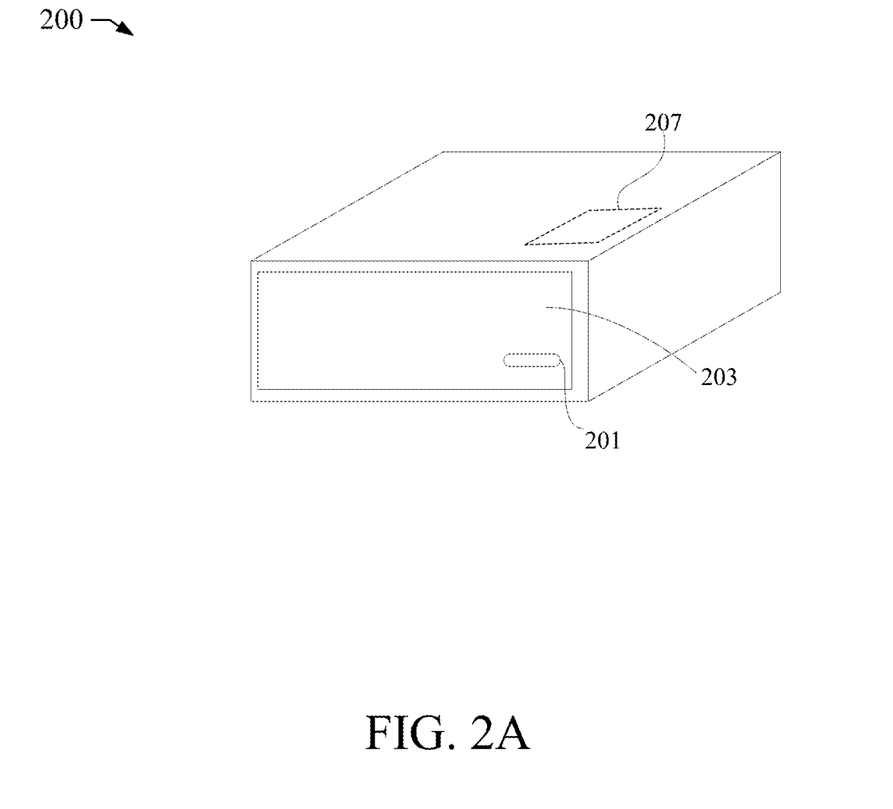
FIG. 2A shows a server that includes a reversible connector console/service port according to one embodiment.

FIG. 2A shows a server 200 that includes a reversible connector console/service port 201 according to one embodiment. Referring to FIG. 2A, server 200 includes chassis 203 within which console/service port 201 is integrated. In one embodiment, console/service port 201 functions cooperatively with power supply components 207 (internal to server 200 and represented by dashed box in FIG. 2A) that are configured to support the use of console/service port 201 as a power delivery source.

In one embodiment, console/service port 201 can be implemented with ports that are specially designed to meet the functional requirements described herein. In other embodiments, console/service port 201 can be implemented with an available port that may meet the functional requirements described herein. For example, in one embodiment, console/service port 201 can be implemented using a Universal Serial Bus (USB) type 3.1 port that uses a type C connector with Power Delivery (PD) 2.0 specs. In other embodiments, other type ports that support reversible connectors and that are capable of being a primary source of power for multiple peripherals can be used. In one embodiment, in contrast to non-service related ports on conventional servers (e.g., USB type ports having functionality and connector specifications dissimilar to that described herein), console/service port 201 is a reversible connector port that is capable of power delivery, supports existing protocols, supports network booting, and transfers data at high speed as is described hereinabove.

Existing console ports on conventional servers are cumbersome, utilize delicate connectors and are limited to the support of KVM/USB devices that do not accommodate reversible connectors. Console/service port 201 can simplify datacenter troubleshooting by utilizing a reversible-plug connector, providing high data transmission speeds, providing power output on a single port, supporting use with any server platform, and supporting a single cable power and video output that eliminates messy cabling. In one embodiment, console/service port 201 can support data transmission at speeds up to 10 Gbps. In other embodiments, console/service port 201 can support data transmission at other speeds greater than or less than 10 Gbps. In one embodiment, console/service port 201 can provide 100 watts of power on a single port. In other embodiments, console/service port 201 can provide other levels of power on a single port.

Figure 2B:
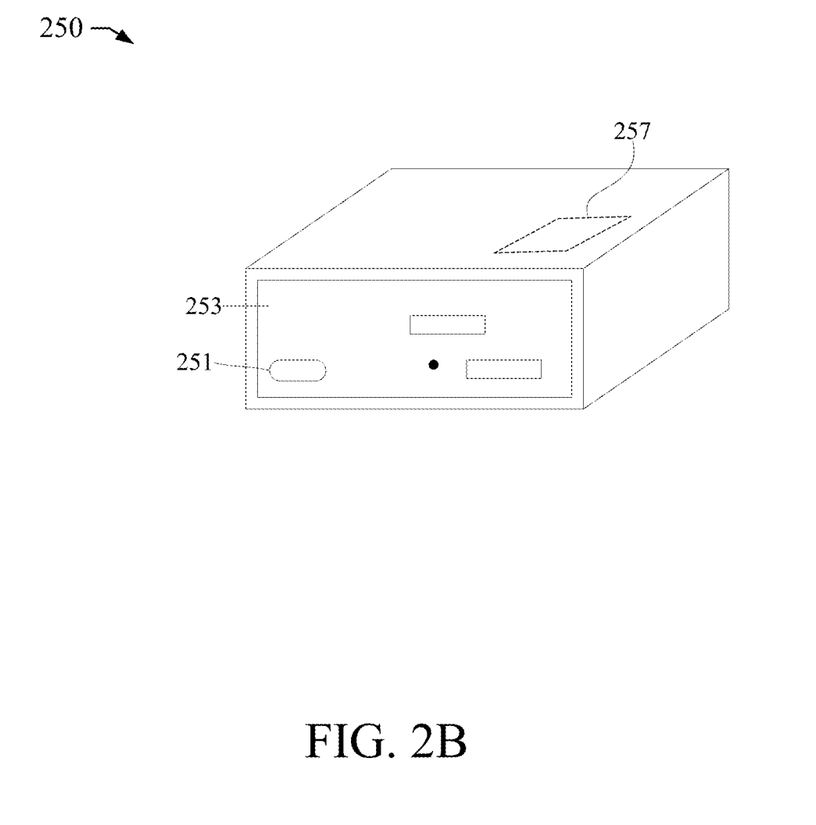
FIG. 2B shows a storage array controller that includes a reversible connector console/service port according to one embodiment.

FIG. 2B shows a storage array controller 250 that includes a reversible connector console/service port 251 according to one embodiment. Referring to FIG. 2B, storage array controller 250 includes chassis 253 within which console/service port 251 is integrated. In one embodiment, console port 251 can replace conventional ports on existing storage array controllers (for example the micro-DB9 and service ports on a VMAX3/VPLEX TM controller or service ports on any other conventional storage array controller). In one embodiment, console/service port 251 functions cooperatively with power supply components 257 (internal to storage array controller 250 and represented by dashed box in FIG. 2B) that are configured to support the use of console port 251 for power transmission.

In one embodiment, console/service port 251 can be implemented with ports that are specially designed to meet the functional requirements described herein. In other embodiments, console port 201 can be implemented with an available port that may meet the functional requirements described herein. For example, in one embodiment, console/service port 251 can be implemented using a USB type 3.1 port that uses a type-C connector with PD 2.0 specs. In other embodiments, other type ports that support reversible connectors and that are capable of being a primary source of power for multiple peripherals can be used. In one embodiment, in contrast to ports on conventional servers (e.g., USB type ports having functionality and connector specifications dissimilar to that described herein), console port 201 is a reversible connector port that is capable of power transmission, supports existing protocols, supports network booting, and transfers data at high speed as is described hereinabove.

Existing console ports on conventional servers can be small serial connector/HDMI or Micro USB connectors which are cumbersome to connect and provide limited troubleshooting capability. Console port 251 can simplify storage array initializing and troubleshooting by supporting a reversible-plug connector, providing high data transmission speeds, providing power on a single port, supporting use with any server platform and supporting a single cable power and video output that eliminates messy cabling. In one embodiment, console port 251 can support data transmission at speeds up to 10 Gbps. In other embodiments, console port 251 can support data transmission at other speeds greater than or less than 10 Gbps. In one embodiment, console port 251 can provide 100 watts of power on a single port. In other embodiments, console port 251 can provide other levels of power on a single port.

Figure 3:
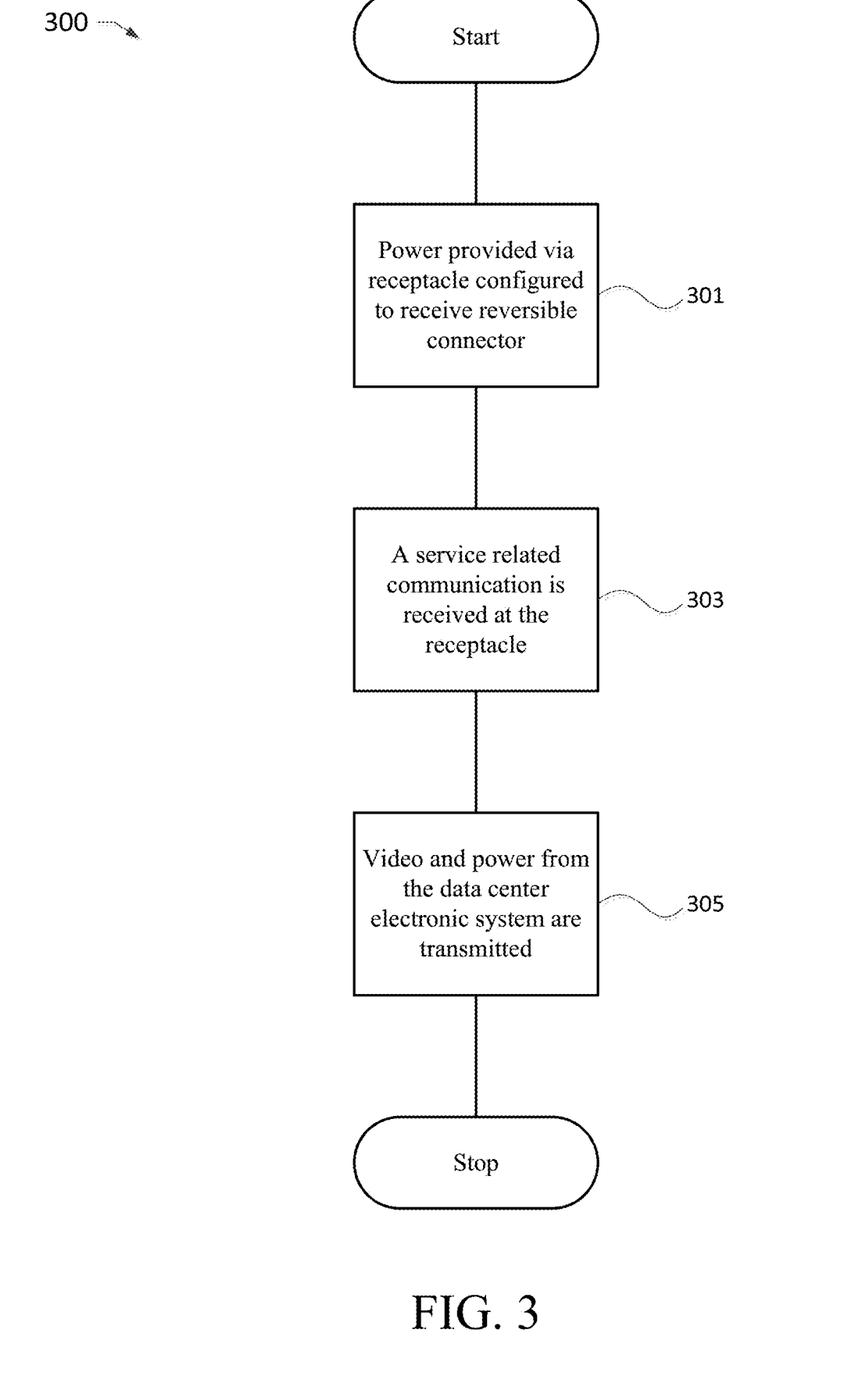
FIG. 3 shows a flowchart of a method for using a console port for a data center electronic system according to one embodiment.

FIG. 3 shows a flowchart 300 of a method for using a console/service port that provides a service connection interface to a data center electronic system according to one embodiment. The flowchart includes processes that, in one embodiment can be carried out by processors and electrical components under the control of computer-readable and computer-executable instructions. Although specific steps are disclosed in the flowcharts, such steps are exemplary. That is the present embodiment is well suited to performing various other steps or variations of the steps recited in the flowchart.

Referring to FIG. 3, at 301, power is provided to a troubleshooting monitor via a receptacle that is coupled to the electronic data center system (e.g., server, storage array, networking system, converged infrastructure) and that is configured to receive a reversible connector. In one embodiment, the receptacle includes a plurality of connection interface components that are integral with the receptacle and that are configured to engage components of the reversible connector.

At 303, a service related communication is received from the trouble shooting monitor at the receptacle. In one embodiment, a first number of the aforementioned plurality of connection interface components are for video transmission and a second number of the plurality of connection interface components are for power transmission.

At 305, via the receptacle, video and power are transmitted from the data center electronic system for access by the monitor.

A server/storage array console port for providing a service connection interface to a server or storage array is disclosed. The server/storage array console port includes a receptacle that is coupled to the server or storage array and that is configured to receive a reversible connector. The console port further includes a plurality of connection interface components integral with the receptacle. A first number of the plurality of connection interface components are for video transmission and a second number of the plurality of connection interface components are for power transmission. Video and power are transmitted simultaneously.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

What is claimed is:

1. A server console port for providing a service connection interface to a server, comprising:
    a receptacle that is coupled to the server and that is configured to receive a reversible connector; and a plurality of connection interface components integral with the receptacle, wherein a first number of the plurality of connection interface components are for video transmission and a second number of the plurality of connection interface components are for power transmission, wherein the first number of the plurality of connection interface components are different from the second number of the plurality of connection interface components, wherein the plurality of connection interface components are configured to transmit video via the first number of the plurality of connection interface components and power via the second number of the plurality of connection interface components simultaneously; and wherein the server console port supports network booting of the storage array to boot the storage array from a network.

2. A storage array console port for providing a service connection interface to a storage array, comprising:

a receptacle that is coupled to the storage array and that is configured to receive a reversible connector; and a plurality of connection interface components integral with the receptacle, wherein a first number of the plurality of connection interface components are for video transmission and a second number of the plurality of connection interface components are for power transmission, wherein the first number of the plurality of connection interface components are different from the second number of the plurality of connection interface components, wherein the plurality of connection interface components are configured to transmit video via the first number of the plurality of connection interface components and power via the second number of the plurality of connection interface components simultaneously; and wherein the storage array console port supports network booting of the storage array to boot the storage array from a network.

3. A method of using a console port for providing a service connection interface to a data center electronic system module, the method comprising:

providing power to a monitor that has a console for troubleshooting and diagnostics via a receptacle of the console port that comprises a plurality of connection interface components that are integral with the receptacle and that are configured to engage components of a reversible connector, wherein a first number of the plurality of connection interface components are for video transmission and a second number of the plurality of connection interface components are for power transmission, and wherein the first number of the plurality of connection interface components are different from the second number of the plurality of connection interface components;

receiving a service related communication from the troubleshooting and diagnostics console at the receptacle; and from the receptacle, transmitting video via the first number of the plurality of connection interface components and power via the second number of the plurality of connection interface components from the data center electronic system module for access by the monitor; and wherein the console port supports network booting of the data center electronic system module to boot the data center electronic system module from a network.

4. The server console port of claim 1 further comprising power supply components that are coupled to a power supply of the server.

5. The server console port of claim 1 wherein the server console port is configured to provide power up to 32 inches from the connection interface assembly.

6. The server console port of claim 1 wherein the server console port supports a plurality of communication protocols.

7. The server console port of claim 1 wherein the server console port is configured to simultaneously power a plurality of electronic devices.

8. The storage array console port of claim 2 further comprising power supply components that are coupled to a power supply of the storage array.

9. The storage array console port of claim 2 wherein the storage array console port is configured to provide power up to 32 inches from the connection interface assembly.

10. The storage array console port of claim 2 wherein the storage array console port supports a plurality of communication protocols.

11. The storage array console port of claim 2 wherein the storage array console port is configured to simultaneously power a plurality of electronic devices.

12. The method of claim 3 wherein the console port provides power up to 32 inches from the console port.

13. The method of claim 3 wherein the console port supports a plurality of communication protocols.

14. The method of claim 3 wherein the console port simultaneously powers a plurality of electronic devices.

15. A server console port for providing a service connection interface to a server, comprising:

a receptacle that is coupled to the server and that is configured to receive a reversible connector; and a plurality of connection interface components integral with the receptacle, wherein a first number of the plurality of connection interface components are for video transmission and a second number of the plurality of connection interface components are for power transmission, wherein the first number of the plurality of connection interface components are different from the second number of the plurality of connection interface components, wherein the plurality of connection interface components are configured to transmit video via the first number of the plurality of connection interface components and power via the second number of the plurality of connection interface components simultaneously; and wherein the server console port is configured to simultaneously power a plurality of electronic devices.

16. The server console port of claim 15 further comprising power supply components that are coupled to a power supply of the server.

17. The server console port of claim 15 wherein the server console port is configured to provide power up to 32 inches from the connection interface assembly.

18. The server console port of claim 15 wherein the server console port supports a plurality of communication protocols.

19. A storage array console port for providing a service connection interface to a storage array, comprising:

a receptacle that is coupled to the storage array and that is configured to receive a reversible connector; and a plurality of connection interface components integral with the receptacle, wherein a first number of the plurality of connection interface components are for video transmission and a second number of the plurality of connection interface components are for power transmission, wherein the first number of the plurality of connection interface components are different from the second number of the plurality of connection interface components, wherein the plurality of connection interface components are configured to transmit video via the first number of the plurality of connection interface components and power via the second number of the plurality of connection interface components simultaneously; and wherein the storage array console port is configured to simultaneously power a plurality of electronic devices.

20. The storage array console port of claim 19 further comprising power supply components that are coupled to a power supply of the storage array.

21. The storage array console port of claim 19 wherein the storage array console port is configured to provide power up to 32 inches from the connection interface assembly.

22. The storage array console port of claim 19 wherein the storage array console port supports a plurality of communication protocols.

23. A method of using a console port for providing a service connection interface to a data center electronic system module, the method comprising:
  providing power to a monitor that has a console for troubleshooting and diagnostics via a receptacle of the console port that comprises a plurality of connection interface components that are integral with the receptacle and that are configured to engage components of a reversible connector, wherein a first number of the plurality of connection interface components are for video transmission and a second number of the plurality of connection interface components are for power transmission, and wherein the first number of the plurality of connection interface components are different from the second number of the plurality of connection interface components;
  receiving a service related communication from the troubleshooting and diagnostics console at the receptacle; and
  from the receptacle, transmitting video via the first number of the plurality of connection interface components and power via the second number of the plurality of connection interface components from the data center electronic system module for access by the monitor; and
  wherein the console port simultaneously powers a plurality of electronic devices.

24. The method of claim 23 wherein the console port provides power up to 32 inches from the console port.

25. The method of claim 23 wherein the console port supports a plurality of communication protocols.

* * * * *